United States Patent
Sheffer et al.

(10) Patent No.: US 10,387,494 B2
(45) Date of Patent: *Aug. 20, 2019

(54) GUIDED DATA EXPLORATION

(71) Applicant: Oracle International Corporation, Redwood Shores, CA (US)

(72) Inventors: Uri Sheffer, Brookline, MA (US); Adam Craig Pocock, Burlington, MA (US); Brook Stevens, Arlington, MA (US); Mashhood Ishaque, Arlington, MA (US); Vladimir Zelevinsky, Sharon, MA (US); Tristan R. Spaulding, Medford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/678,218

(22) Filed: Apr. 3, 2015

(65) Prior Publication Data

US 2016/0085851 A1    Mar. 24, 2016

Related U.S. Application Data (60) Provisional application No. 62/054,517, filed on Sep. 24, 2014.

(51) Int. Cl.
| | | |
|---|---|---|
| *G06F 17/30* | (2006.01) | |
| *G06F 16/901* | (2019.01) | |
| *G06F 16/904* | (2019.01) | |
| *G06F 16/33* | (2019.01) | |
| *G06F 16/26* | (2019.01) | |
| *G06F 16/248* | (2019.01) | |

(52) U.S. Cl.
CPC .......... *G06F 16/901* (2019.01); *G06F 16/248* (2019.01); *G06F 16/26* (2019.01); *G06F 16/3331* (2019.01); *G06F 16/904* (2019.01)

(58) Field of Classification Search
CPC ......... G06F 17/30619; G06F 17/30657; G06F 17/30946; G06F 17/30994
See application file for complete search history.

(56) References Cited

U.S. PATENT DOCUMENTS

| 6,012,053 A | 1/2000 | Pant et al. |
| 6,035,294 A | 3/2000 | Fish |
| 6,195,652 B1 | 2/2001 | Fish |

(Continued)

OTHER PUBLICATIONS

Wikipedia, the free encyclopedia, "Entropy (information theory)", http://en.wikipedia.org/w/index.php?title=Entropy_(information_theory)&printable=yes, last downloaded Apr. 3, 2015.

(Continued)

*Primary Examiner* — Etienne P Leroux
*Assistant Examiner* — Husam Turki Samara
(74) *Attorney, Agent, or Firm* — Potomac Law Group, PLLC (57) ABSTRACT

A system for exploring data receives the data from a database and indexes the data in a server. The system displays one or more selectable datasets from the indexed data, where the selected dataset includes one or more attributes. The system then sorts the one or more attributes by level of interestingness and displays the sorted attributes.

20 Claims, 6 Drawing Sheets

(56) References Cited

U.S. PATENT DOCUMENTS

| | | |
|---|---|---|
| 6,243,699 B1 | 6/2001 | Fish |
| 7,587,685 B2 | 9/2009 | Wallace |
| 7,873,220 B2 | 1/2011 | Collins |
| 8,005,643 B2 | 8/2011 | Tunkelang et al. |
| 8,417,715 B1 | 4/2013 | Bruckhaus et al. |
| 9,183,203 B1 | 11/2015 | Tuchman et al. |
| 2007/0094060 A1 | 4/2007 | Apps et al. |
| 2009/0006382 A1 | 1/2009 | Tunkelang et al. |
| 2009/0112904 A1 | 4/2009 | Cubranic |
| 2011/0119273 A1 | 5/2011 | Abhyankar et al. |
| 2011/0302226 A1 | 12/2011 | Abadi et al. |
| 2012/0278321 A1* | 11/2012 | Traub ............ G06F 17/30657 707/736 |
| 2012/0313947 A1 | 12/2012 | Rope et al. |
| 2012/0313949 A1 | 12/2012 | Rope et al. |
| 2013/0080373 A1 | 3/2013 | Yeck et al. |
| 2013/0166568 A1 | 6/2013 | Binkert et al. |
| 2014/0095542 A1 | 4/2014 | Zelevinsky |
| 2014/0114707 A1 | 4/2014 | Rope et al. |
| 2014/0218383 A1 | 8/2014 | Srivastava |
| 2014/0280190 A1 | 9/2014 | Cronin et al. |
| 2014/0344235 A1* | 11/2014 | Zarpas ............ G06F 16/22 707/696 |
| 2015/0112969 A1* | 4/2015 | Prabhu ............ G06Q 10/06 707/722 |

OTHER PUBLICATIONS

Anonymous; "Can Endeca Provide an Alternative to OBIEE for Fast, Complex, Ad-hoc Analysis?"; Mar. 23, 2013; XP055440952.
Anonymous; "Oracle Endeca 101 Developer Introduction High Level Overview"; Apr. 10, 2014; XP055440960.

\* cited by examiner

ORACLE® Big Data Discovery | CATALOG

675 DATA SETS  78 PROJECTS — 301

CREATE NEW ▦ Data Set    CREATE NEW ⌬ Project

Search

REFINE BY

USAGE
- Created by me
- My Favorite
- Certified/Gold Standard

CONTENT
- Contains Dates
- Contains Locations
- Date Granularity
- Location Granularity
- Contains Language

META DATA
- Category/Topic/Theme
- Tags
- Date Created (not available for HDFS)

< 1 >  DATA SETS (675) ˅       — 305

| | | |
|---|---|---|
| ▦ | Sales Team Goals (1,435,206) Preview<br>Sales objectives by team member by period<br>DATA SOURCE: HDFS | 2 ☆ ⊙⊛ |
| ▦ | Wine Sales (125,452,378) Preview<br>US wine market sales transactions<br>DATA SOURCE: SALES (BI SERVER)<br>*Sales, wine, US* | 12 ☆ ⊙⊛ |
| ▦ | Wine Market Share by Major Varietal (134,216) Preview<br>Information on wine regions, major wineries, and the wine industry by comparing traditional wine markets versus recent data on consumption<br>DATA SOURCE: MY FILE (EXCEL)<br>*Regions, wineries, industry* | 29 ☆ ⊙⊛ |
| ▦ | Trends in the US Wine Industry in 2013 (1,435,206) Preview<br>San Rafael, Calif.—Winery giants E. & J. Gallo and Constellation Wines dominated the top 20 wine brands selling off-premise through May, according to market research firm IRI with analysis by Wines & Vines<br>DATA SOURCE: HDFS<br>*Trends, wine, restaurant, sales* | 8 ☆ ⊙⊛ |
| ▦ | 2014 Sales Targets (114,878) Preview<br>This dataset reflects reported ROI from ads part of a new strategy to target middle-aged drinkers<br>DATA SOURCE: SOME DATABASE (JDBC)<br>*Sales, market share* | 9 ☆ ⊛ |
| ▦ | Drought Effects on Vineyard Production (114,878) Preview<br>USDA director sees drought effects on large number of vineyards. Top wine grape grower issues - Drought's impact on grape vines.<br>DATA SOURCE: SOME DATABASE (JDBC) | 0 ☆ ⊙⊛ |
| ▦ | YTD Shipments (114,878) Preview<br>Beer, Wine, and Spirits Away from Home 2012 to 2013, June YTD including shipment volumes in the top 10 states, % of the national total, and volumes change in top ten states.<br>DATA SOURCE: SOME DATABASE (JDBC)<br>*Wines, sports, shipments* | 14 ☆ ⊙⊛ |
| ▦ | Drought Effects on Vineyard Production (114,878) Preview<br>This dataset reflects reported incidents of crime that have occurred in the City of | 3 ☆ ⊙⊛ |

< 1 >  PROJECTS (78) ˅

| | | |
|---|---|---|
| ◈ | World Wine Consumption Study (120,340)<br>Created by: *The Wine Institute* | 42 ☆ ⊙⊛ |
| ◈ | Countries by Alcohol Consumption (79,503)<br>Created by: *John Abigail* | 3 ☆ ⊙⊛ |
| ◈ | Statistical Report on world vitiviniculture (54,615)<br>Created by: *John Abigail* | 2 ☆ ⊙⊛ |
| ◈ | Market Analysis of French Wine Drinkers (120,340)<br>Created by: *data.cityanalytics.org* | 14 ☆ ⊙⊛ |
| ◈ | The world's wine consumption 2000-2012 (58,311)<br>Created by: *John Abigail* | 6 ☆ ⊙⊛ |
| ◈ | Wine & Beer Social Media Extract (58,474)<br>Created by: *explore.vinosocial.org* | 9 ☆ ⊙⊛ |
| ◈ | National Wine Production and Consumption (120,340)<br>Created by: *John Abigail* | 3 ☆ ⊙⊛ |
| ◈ | Seattle Wine Regions (33,120)<br>Created by: *John Abigail* | 0 ☆ ⊙ |
| ◈ | Wine Industry Statistics (60,470)<br>Created by: *John Abigail* | 4 ☆ ⊙⊛ |
| ◈ | International Wine review (32; 340)<br>Created by: *data.cityofnewyork.us* | 39 ☆ ⊙⊛ |
| ◈ | Wine Annual Report and Statistics 2013 (120,335)<br>Created by: *John Abigail* | 16 ☆ ⊙⊛ |
| ◈ | California Code of Sustainable Winegrowing Workbook (58,474)<br>*California Sustainable Winegrowing Alliance (CSWA)* | 9 ☆ ⊙⊛ |

GUIDED DATA EXPLORATION

CROSS REFERENCE TO RELATED APPLICATIONS

This application claims priority of Provisional Patent Application Ser. No. 62/054,517, filed on Sep. 24, 2014, the contents of which is hereby incorporated by reference.

FIELD

One embodiment is directed generally to a computer system, and in particular to a computer system that provides analysis of data through guided data exploration.

BACKGROUND INFORMATION

In recent years, computer systems have enabled individuals and organizations to capture and store vast quantities of data. The proliferation of data is sometime referred to as "big data", which is an all-encompassing term for any collection of datasets so large or complex that it becomes difficult to process using traditional data processing applications.

The challenges of big data include analysis, capture, curation, search, sharing, storage, transfer, visualization, and privacy concerns. The existence of such large quantities of data has led to an ever increasing need for improved systems and methods of analyzing and exploring data.

SUMMARY

One embodiment is a system for exploring data. The system receives the data from a database and indexes the data in a server. The system displays one or more selectable datasets from the indexed data, where the selected dataset includes one or more attributes. The system then sorts the one or more attributes by level of interestingness and displays the sorted attributes.

DETAILED DESCRIPTION

Embodiments of the invention provide guided data exploration. One of the embodiments generates a user interface that displays indexed datasets (i.e., collections of data or data records) and allows a user to select one of the datasets. In response, the user interface displays attributes of the selected dataset in order of interestingness. The user can then further select one or more values of the attributes, which results in a refining of the dataset to assist the user in the selection and display of the desired data.

Figure 1:
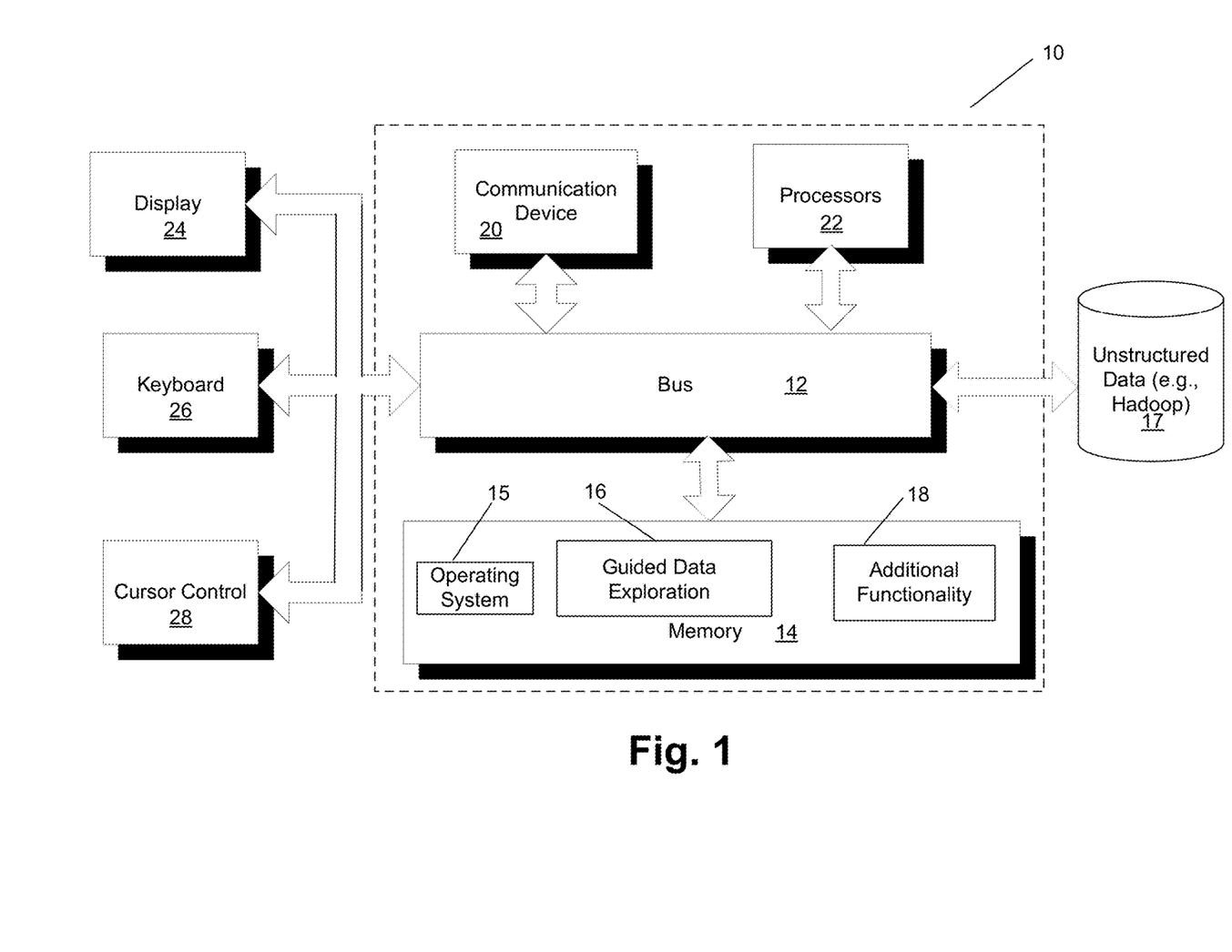
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more component of system 10 may not be included. For example, for functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a guided data exploration module 16 for providing guided data exploration functionality, and all other functionality disclosed herein. System 10 can be part of a larger system. Therefore, system 10 can include one or more additional functional modules 18 to include the additional functionality, such as an enterprise resource planning ("ERP") module that generates ERP data to be explored by module 16. A database 17 is coupled to bus 12 to provide centralized storage for modules 16 and 18 and store unstructured data, structured data, etc.

Each module can include multiple modules. In one embodiment, module 16 includes an indexing module that receives data from a database and indexes the data, a display module that displays one or more selectable datasets from the indexed data, and a sorting module that receives a selection of one or more of the selectable datasets and sorts the one or more attributes by level of interestingness.

Figure 2:
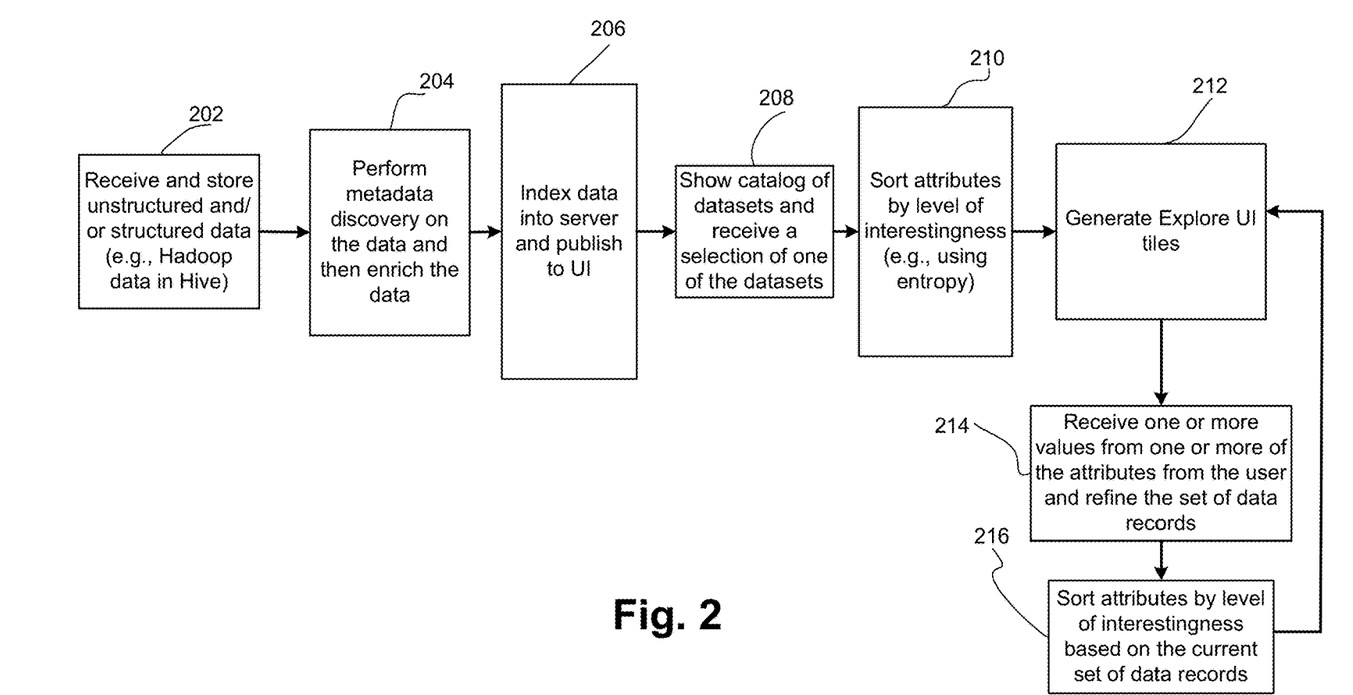
FIG. 2 is a flow diagram of the functionality of the guided data exploration module of FIG. 1 and other elements in accordance with one embodiment of the present invention.

FIG. 2 is a flow diagram of the functionality of guided data exploration module 16 and other elements in accordance with one embodiment of the present invention. In one embodiment, the functionality of the flow diagrams of FIG.

Figure 6:
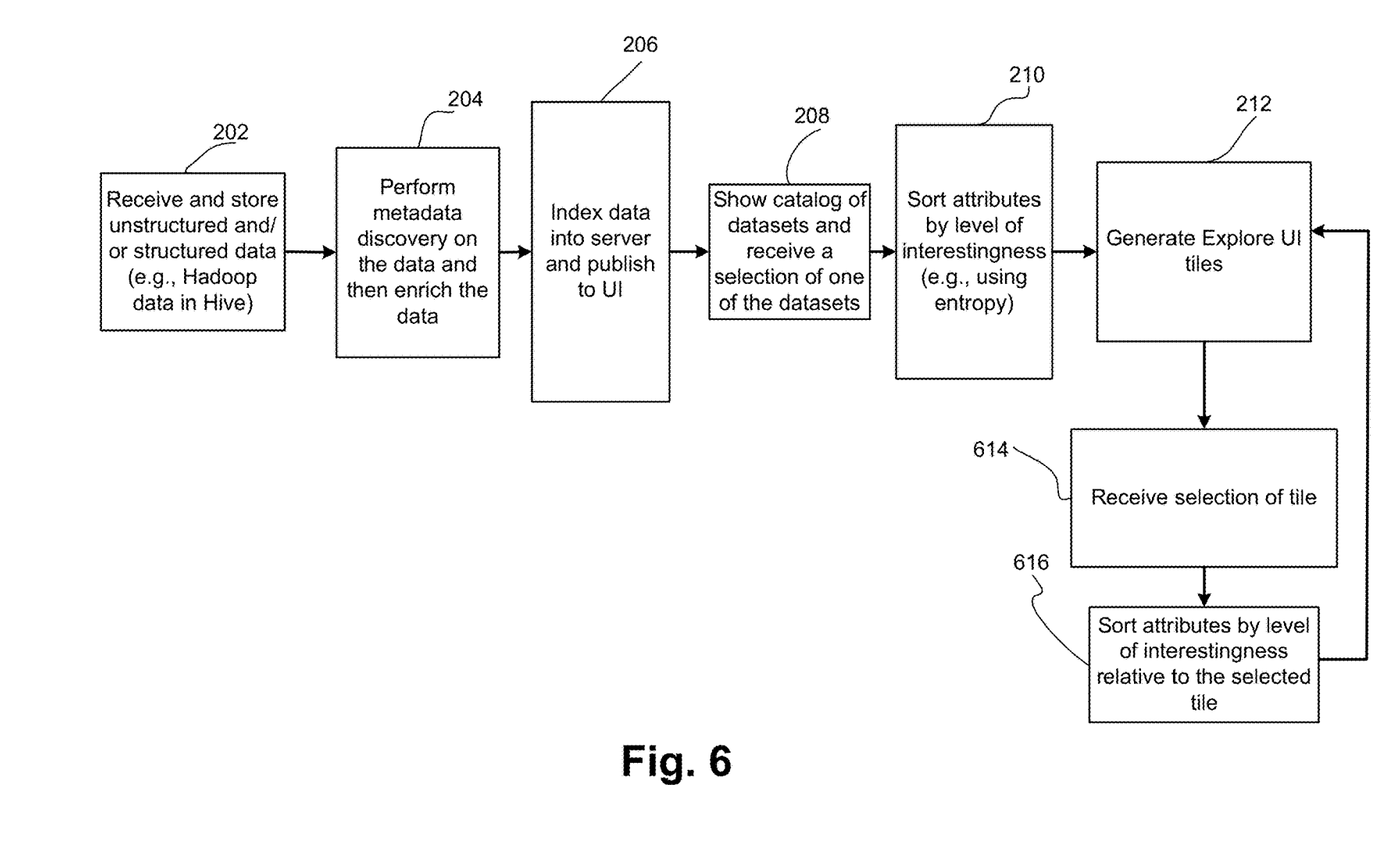
FIG. 6 is a flow diagram of the functionality of the guided data exploration module of FIG. 1 and other elements in accordance with one embodiment of the present invention.

2 and FIG. 6 is implemented by software stored in memory or other computer readable or tangible medium, and executed by a processor. In other embodiments, the functionality may be performed by hardware (e.g., through the use of an application-specific integrated circuit ("ASIC"), a programmable gate array ("PGA"), a field programmable gate array ("FPGA"), etc.), or any combination of hardware and software.

At 202, unstructured or partially structured data is stored in database 17 of FIG. 1. In one embodiment, the data is stored in an Apache Hive, which is a data warehouse infrastructure built on top of Hadoop for providing data summarization, query, and analysis. However, any type of unstructured or structured data can be received and stored at 202. For example, in one embodiment the data is a large amount of Twitter "tweets". In one embodiment, the data is stored in a Hadoop Distributed File System ("HDFS").

At 204, metadata discovery is performed on the data from 202, and the data is then enriched according to the results of metadata discovery. In one embodiment, metadata discovery is performed to determine the nature/type of data from the data itself (e.g., is the data a number, a geo-code, etc.), including the cardinality of the data. In one embodiment, the data discovery is performed by the "Endeca Information Discovery Studio Provisioning Service", from Oracle Corp. The metadata discovery generates a list of metadata that feeds into a user interface. In one embodiment, the enrichment is not performed. In another embodiment, both the type discovery and enrichment is not performed.

Table 1 below provides some example metadata:

TABLE 1

| Name | Description |
| --- | --- |
| id | Value that uniquely identifies a dataset. |
| collectionKey | Name of the collection that contains the data for this dataset. |
| sourceType | Where this dataset gets its data from. |
| sourceName | The name of the database/table/file that this dataset gets its data from. |
| displayName | This will be displayed as the dataset name |
| description | Description of the dataset. |
| timesViewed | The number of times this dataset has been viewed by a user. |
| timesFavorited | The number of times this dataset has been favorited by a user. |

At 206, the data from 204 is indexed into a server and published to a user interface. In one embodiment, the data is indexed at 206 as an Endeca index in an "MDEX" engine from Oracle Corp.

Figure 3:
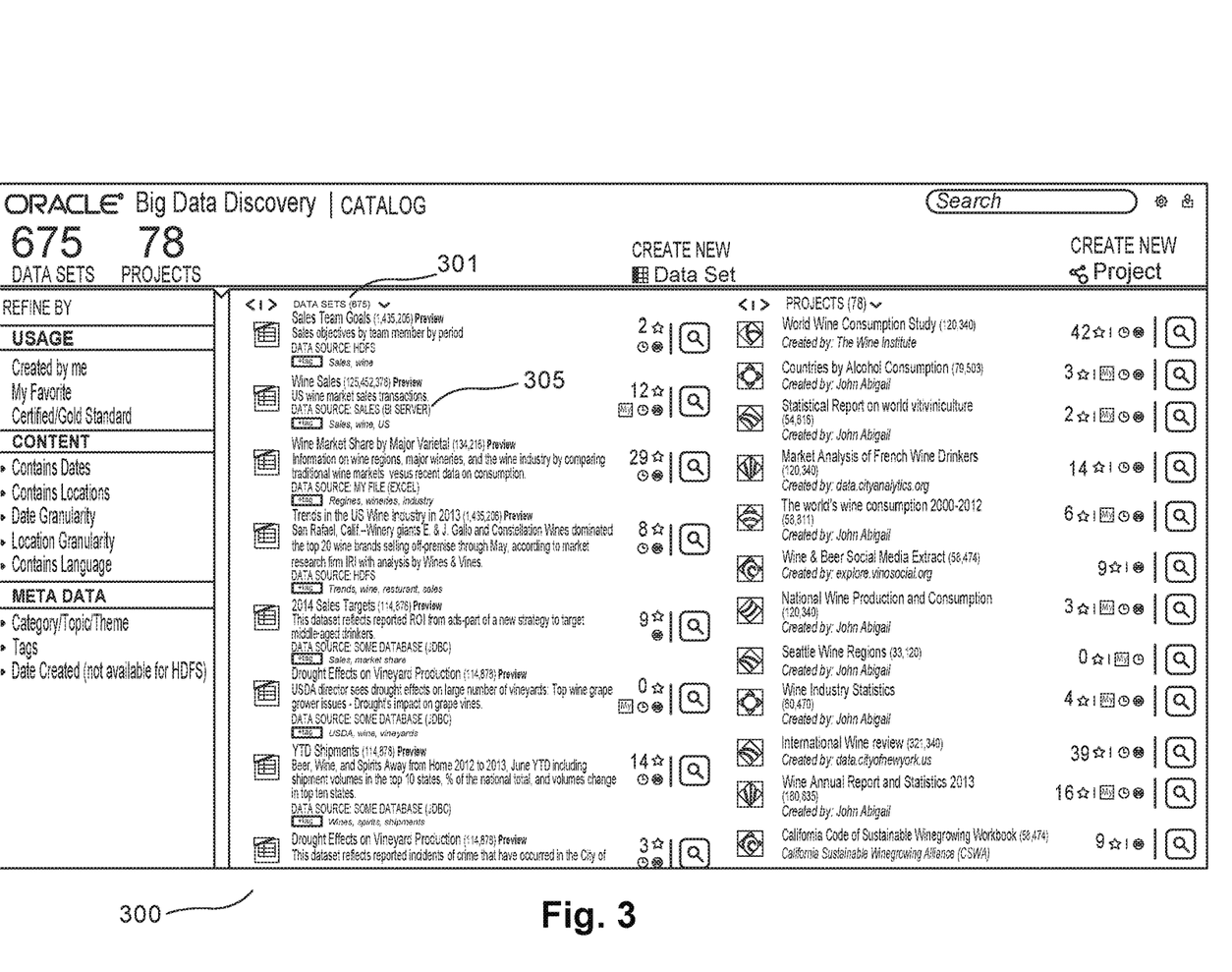
FIG. 3 illustrates an example user interface displaying available datasets in accordance with one embodiment.

At 208, the user interface is generated that displays all available datasets/data records or catalog of datasets that are indexed on the server. FIG. 3 illustrates an example user interface 300 displaying the available datasets at 301 in accordance with one embodiment. A total of 675 datasets are available via the interface (not all shown in FIG. 3). Each dataset is selectable by the user. In one embodiment, only a single dataset may be available and shown at 208. A selection of one of the datasets can also be received at 208. In one embodiment, a selection is not required at 208.

Figure 4:
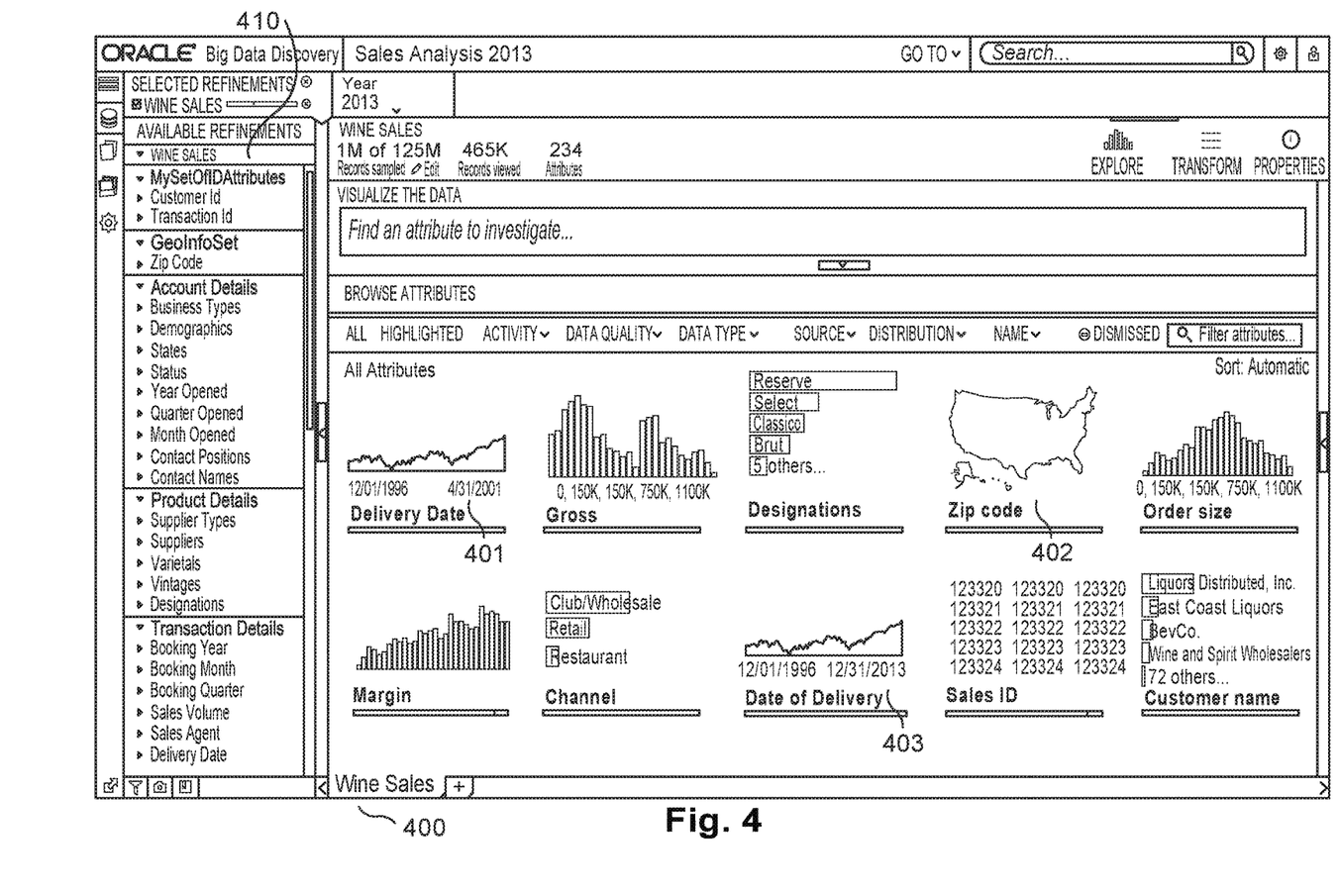
FIG. 4 illustrates an example user interface displaying the attributes shown as sorted "tiles" after the selection of the "wine sales" dataset of FIG. 3 in accordance with an embodiment.

In response to a selection of a dataset at 208, the attributes are sorted by level of interestingness at 210 and an "explorer" user interface is generated at 212 for the selected dataset. The attributes of the dataset are listed for further exploration/selection. FIG. 4 illustrates an example user interface 400 displaying the attributes shown as sorted "tiles" after the selection of the "wine sales" dataset 305 of FIG. 3 in accordance with an embodiment. Example tiles include a "delivery date" tile 401, a "zip code" tile 402, a "date of delivery" tile 403, etc. Each tile summarizes a variable/attribute from the selected data set, and the tiles are sorted by order of interestingness (i.e., a computation of a predictor of how likely the user will find each attribute, and the corresponding representative tile for that attribute, interesting) so that the attributes that most explain the dataset are initially displayed. In one embodiment, as described in detail below, entropy is used to determine the sorting by levels of interestingness. In another embodiment, the representative tile are sorted alphabetically. In another embodiment, the representative tiles are listed in the order that the tiles occur in the data (i.e., no sorting).

User interface 400 further includes a list of available refinements shown on the left side at 410. As part of the generation of tiles at 212, the type of visualization (e.g., bar chart, graph, map, etc.) is also determined. In one embodiment, a hard coded decision tree is used to determine the type of visualization. In FIG. 4, each tile represents an attribute of a dataset (i.e., a column of database attributes). A user can also zoom into a particular tile/column. Therefore, a user can have at a glance a view of each particular column/tile that includes the metadata.

Referring again to FIG. 2, at 214 the user selects (or unselects) from the list of available refinements 410, one or more values from one or more of the attributes, refining the datasets.

At 216, the attributes/tiles are again sorted by level of interestingness based on the current dataset, and the user interface showing a revised set of selectable data records is generated at 212. 214 and 216 can be repeated as many times as necessary so that the selection of the records from the dataset is iteratively refinable.

The embodiment of FIG. 2 is considered "univariate" because each column is considered separately.

In one embodiment, entropy is used to determine the level of interestingness of tiles/attributes at 210 of FIG. 2. "Entropy" is a measurement of the uncertainty in a random variable. The typical unit of measure used with entropy is a "bit". The more uncertain the outcome of the random variable, the more bits are needed to represent the different values.

As an example, assume there is a need to record the outcome of an experiment that can either be "1000" or "2000". First, since there are only two possible outcomes, there is no need for the entire memory (bit-wise) representation "1000" or "2000". Instead, a convention of "0" to indicate the former and "1" to indicate the latter can be used. The true representation of the outcome is therefore only 1 bit, and forms the upper limit to the entropy of this random variable.

Second, if the probability of the experiment's outcome is known, the entropy value can be further diminished, since the uncertainty inherent of this variable has been reduced. For example, tossing an unbiased coin yields an equal 0.5 chance (probability) of a tails or heads outcome. Since the uncertainty is high, the entropy would reflect its highest value (i.e., 1). If, however, the outcome records whether women are pregnant or not, and it is known that pregnant women account for 5% of the women population, the entropy will drop and indicate a value of 0.2864 bits.

Every attribute of the datasets, such as datasets 301 of FIG. 3, has its own entropy value (also referred to as "self-information") and denotes how much information is given by this attribute. This information (also known as "information gain") can be determined based on the uncertainty of the attribute. For example, if all the values of a particular attribute are the same (a single value outcome), the attribute carries no signal, and therefore has zero information gain.

The entropy value calculated for a single attribute is a non-negative number and ranges from 0 up to log |x| (pronounced as "log of count of x"), where |x| is the number of different values of this attribute. For the values of entropy to be expressed in bits, the logarithm is taken in base 2. In such a case, for example, the column with four equally distributed values carries log 4=2 bits of information. As a different example, for a variable whose outcome is always a zero, the variable has only one outcome value and carries no information, its entropy value being log 1=0. If, to provide another example, x is denoting a uniformly distributed value between 0 and 65536, there is high uncertainty of each value. In this example, there are $65536=2^{16}$ outcomes and, hence, 16 bits of entropy.

Some embodiments compute entropy as Shannon entropy according to the following formula:

$$H(X) = -\sum_{i=1}^{n} p(x_i)\log_b p(x_i)$$

where H (X) is the entropy of variable X, index i loops over all possible n outcomes, $x_i$ represents the possible outcome, and $p(x_i)$ is the probability for outcome $x_i$. In one embodiment, binary (base 2) logarithm is used, in which case the resulting entropy is measured in bits.

Since all probabilities are given as a value in the range between 0 and 1, all log outcomes are negative, hence the negation outside the summation.

In addition, the lower the probability of an outcome, the smaller the probability value and hence the higher the log value. In other words, the infrequent occurring values are, in fact, the biggest contributors to the entropy value.

Some embodiments may normalize the entropy by dividing it by log |n|, making the resulting normalized entropy fall in the range 0-1.

In general, entropy can be evaluated for any discrete variable. In the case of numerical variables, the entropy can be either calculated directly (via the computationally-complex differential approach), or the data can be discretized, or binned, to convert it into a categorical variable. The latter approach potentially causes marginal loss of precision, but gains a considerable simplicity and speed of computation.

In the discrete variable case, the probabilities are the frequencies of the attributes within the dataset. In one embodiment, high cardinality data (e.g., variables that have the number of different values comparable to the number of records in the system; product reviews is an example of such high cardinality data, since every review can reasonably be expected to be different) can be assumed to be uninteresting. In the case of a variable that contains natural language text, term extraction can be used to convert such high cardinality variable into a lower cardinality (and, thus, more interesting) variable.

In one embodiment, the use of entropy values includes calculating the entropy of every attribute of a dataset, normalized to a 0-1 range. Further uses include sorting of the attributes based on descending order of an outcome of an interestingness function, with an attempt to give prominence to the attributes that are more interesting, as described below.

In general, what may be interesting for one data analyst (or scientist) may not be so interesting for another. However, there are two degenerate cases that are simply not interesting by their nature. On the low end of the entropy range (closer to 0) are attributes that hold only a single outcome. Intuitively, these type do not contribute to the overall understanding of the data set. Similarly, on the high end of the entropy values (closer to the normalized value of 1), exist high cardinality attributes (e.g., a product inventory number column, which is expected to be different for every product). Such attributes are not expected to carry information either.

At the values above the low end degenerate case, interesting signal appears, signifying variation on the outcome of this variable. Similarly, there is interesting signal at the values below the high end degenerate case.

Certain embodiments posit a way to translate the precisely-computed entropy into interestingness, by first applying the low-end and high-end cutoffs and then mapping the extreme (low and high) values of entropy to high interestingness, while mapping intermediate values to low interestingness.

Figure 5:
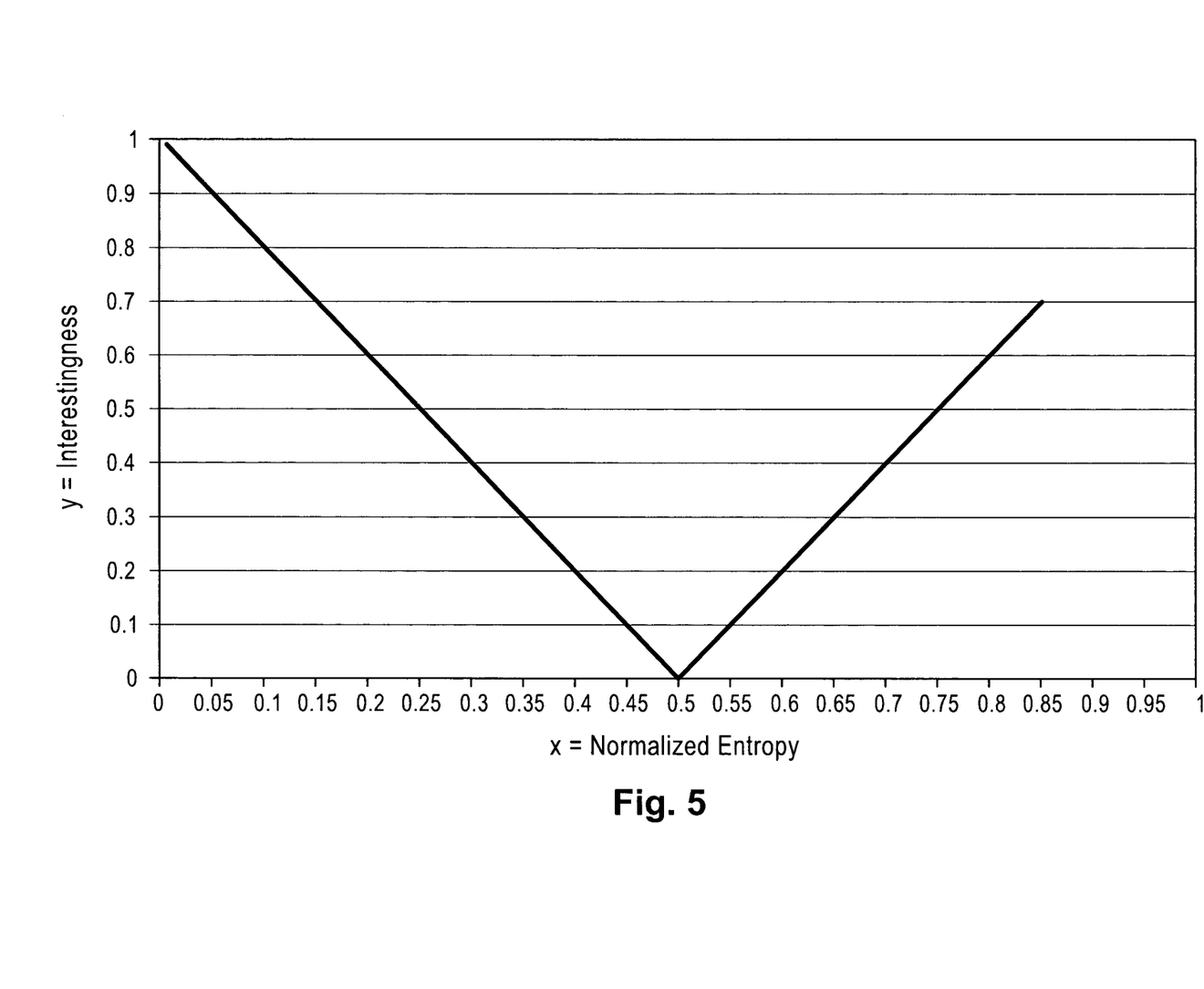
FIG. 5 illustrates a graph of the interestingness in relation to the normalized entropy in accordance with one embodiment.

FIG. 5 illustrates one possible graph of the interestingness in relation to the normalized entropy. In FIG. 5, the x-axis is the normalized entropy from 0 to 1 with 0.5 being the minimum of the mapping curve. The y-axis represents how interesting an attribute will be. In some embodiments the cutoffs for low and high levels of entropy are different and could be tuned independently.

Since the values of entropy span from 0 to log |n|, where n is the number of different outcomes (or values) for each particular column or attribute, comparing entropy values for the attributes with a different number of outcomes can present a challenge. Some embodiments perform entropy normalization by dividing entropy for each particular column by log |n|. The values of normalized entropy fall between 0 and 1 and thus can be compared directly.

For example, consider two columns with the same value of entropy 0.5. If the first column contains only values "true" and "false", it has n=2, and the normalized entropy is 0.5/log(2)=0.5. The same process applied to another column with the same value of entropy 0.5 but with four different values would result in the normalized entropy 0.5/log(4)= 0.25. In this example, two columns with the same value of entropy before normalization would have different values of normalized entropy and, thus, different interestingness.

Other embodiments may utilize different mappings of entropy to interestingness. For example, a parabolic curve with the global minimum in the 0-1 range would also satisfy the above considerations.

Certain embodiments can apply different mappings of entropy to interestingness based on each attribute type. For example, geocodes can be considered always interesting, no matter the distribution of their values.

Some embodiments allow users to dynamically modify the lists of the attributes that have been sorted according to their interestingness. The possibilities include user interface elements such as "remove" and "like" buttons, to correspondingly exclude and promote selected attributes.

Some embodiments add the utilization of machine learning approaches to further determine the specific ranges/thresholds for the degenerate cases based on the interest shown by users.

The embodiments described above compute entropy for each attribute in isolation. In other embodiments, entropy calculations are performed at the bivariate analysis level instead of the univariate level. This allows entropy to be computed between two different attributes (mutual and conditional entropy). In this embodiment, the user may select an attribute before the interestingness-based sorting. In this scenario, the entropy is computed and the interestingness is determined relative to the selected column.

In another embodiment, the user may indicate an interest in an attribute or a set of attributes through some user gesture after the initial univariate interestingness sort is performed. In this scenario, following this user gesture, the attributes of the data set are re-sorted, taking into account the new information.

For the bivariate embodiment, the entropy computation can be based on mutual information. For two attributes X and Y, the mutual information I can be expressed as:

$$I(X;Y) = \sum_{y \in Y} \sum_{x \in X} p(x,y) \log\left(\frac{p(x,y)}{p(x)p(y)}\right),$$

where x and y are possible outcomes for attributes X and Y correspondingly; p(x) and p(y) are probabilities for outcomes x and y correspondingly; p(x, y) is the joint probability for outcomes x and y occurring together (in the same row of data), and the double summation occurs over all possible outcomes.

As an example for the bivariate embodiment, assume that the data has four attributes: x1, x2, x3, x4. Attributes may be discrete or numerical, in which case they can be discretized via binning. For each attribute, the relative entropy (mutual information) is computed relative to the chosen attribute. If x1 denotes the chosen attribute, then for every other attribute x2, x3, x4, embodiments can compute mutual information with respect to x1. The three attributes can then be sorted according to the computed values of mutual information in respect to the selected column x1. For example, if the values of mutual information are I(x1, x2)=0.4; I(x1, x3)=0.6; I(x1, x4)=0.2, then sorting of the attributes according to this mutual information would result in the following ordering of the attributes: x3, x2, x4. Other embodiments might combine this sorting with other considerations. For example, if it is known that the attributes of city, state and zip code are related to one another, such attributes could be kept together during the sort process.

In another embodiment, conditional mutual information can be used, where the conditional mutual information in one example is the expected value of the mutual information of two random variables given the value of a third.

FIG. 6 is a flow diagram of the functionality of guided data exploration module 16 and other elements in accordance with one embodiment of the present invention. FIG. 6 illustrates a bivariate embodiment. The embodiment of FIG. 6 has similar functionality of the embodiment of FIG. 2 at 202, 204, 206, 208, 210 and 212. At 614, a selection of a tile is received. At 616, the attributes are sorted by level of interestingness relative to the selected tile.

As disclosed, embodiments provide guided analysis for exploration of datasets. Attributes of a selected dataset are sorted by levels of interestingness, and a user, through an iterative process, can provide further sorting.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of exploring data, the method comprising:
   receiving the data from a database;
   indexing the data in a server to generate a plurality of database datasets and generate corresponding metadata for each of the database datasets, the metadata comprising at least one of a name and a description of each of the database datasets, each of the database datasets corresponding to a database table that comprises a plurality of database table columns, each with a corresponding attribute, and a plurality of database table rows;
   displaying one or more individually selectable database datasets of the plurality of database datasets from the indexed data, the displaying the selectable database datasets including at least the name and the description of each dataset based on the metadata;
   in response to a selection of a database dataset, sorting the database table columns that correspond to the selected database dataset by level of interestingness using entropy;
   displaying the sorted database table columns of the selected database dataset as individually selectable database table columns comprising sorted visualization elements for each of the columns, the visualization elements displaying each corresponding attribute;
   receiving a selection of one or more of the corresponding attributes; and
   based on the selection of the one or more of the corresponding attributes, repeating the sorting the database table columns by level of interestingness using entropy.

2. The method of claim 1, wherein at least some of the data in the database is unstructured data.

3. The method of claim 1, wherein the using entropy comprises calculating the entropy of each of the corresponding attributes and normalizing the entropy to a 0-1 range.

4. The method of claim 1, wherein the displaying the sorted database table columns comprises displaying a tile for each sorted database table column, the tile comprising a visualization of the database table column.

5. The method of claim 1, further comprising:
   receiving a selection of a refinement from the display of sorted database table columns and, in response:
   applying the selected refinement to the data; and
   re-sorting the database table columns of the refined data.

6. The method of claim 3, wherein the calculating the entropy comprises a Shannon entropy.

7. The method of claim 1, further comprising receiving a dynamic modification of the sorted database table columns using user interface elements to exclude or promote sorted database table columns.

8. The method of claim 1, wherein the displaying one or more selectable database datasets is automatically generated without any user input of search terms.

9. A non-transitory computer readable medium having instructions stored thereon that, when executed by a processor, cause the processor to provided guided data exploration, the providing comprising:
   receiving the data from a database;
   indexing the data in a server to generate a plurality of database datasets and generate corresponding metadata for each of the database datasets, the metadata comprising at least one of a name and a description of each of the database datasets, each of the database datasets corresponding to a database table that comprises a plurality of database table columns, each with a corresponding attribute, and a plurality of database table rows;
   displaying one or more individually selectable database datasets of the plurality of database datasets from the indexed data, the displaying the selectable database datasets including at least the name and the description of each dataset based on the metadata;

in response to a selection of a database dataset, sorting the database table columns that correspond to the selected database dataset by level of interestingness using entropy;
displaying the sorted database table columns of the selected database dataset as individually selectable database table columns comprising sorted visualization elements for each of the columns, the visualization elements displaying each corresponding attribute;
receiving a selection of one or more of the corresponding attributes; and
based on the selection of the one or more of the corresponding attributes, repeating the sorting the database table columns by level of interestingness using entropy.

10. The computer readable medium of claim 9, wherein at least some of the data in the database is unstructured data.

11. The computer readable medium of claim 9, wherein the using entropy comprises calculating the entropy of each of the corresponding attributes and normalizing the entropy to a 0-1 range.

12. The computer readable medium of claim 9, wherein the displaying the sorted database table columns comprises displaying a tile for each sorted database table column, the tile comprising a visualization of the database table column.

13. The computer readable medium of claim 9, the providing further comprising receiving a selection of a refinement from the display of sorted database table columns and, in response:
applying the selected refinement to the data; and
re-sorting the database table columns of the refined data.

14. The computer readable medium of claim 11, wherein the calculating the entropy comprises a Shannon entropy.

15. The computer readable medium of claim 9, the providing further comprising receiving a dynamic modification of the sorted database table columns using user interface elements to exclude or promote sorted database table columns.

16. The computer readable medium of claim 9, wherein the displaying one or more selectable database datasets is automatically generated without any user input of search terms.

17. A guided data exploration system comprising:
one or more processors executing instructions to implement modules, the modules comprising:
an indexing module that receives data from a database and indexes the data in a server to generate a plurality of database datasets and generates corresponding metadata for each of the database datasets, the metadata comprising at least one of a name and a description of each of the database datasets, each of the database datasets corresponding to a database table that comprises a plurality of database table columns, each with a corresponding attribute, and a plurality of database table rows;
a display module that displays one or more individually selectable database datasets of the plurality of database datasets from the indexed data, the displaying the selectable database datasets including at least the name and the description of each dataset based on the metadata;
a sorting module that in response to a selection of a database dataset sorts the database table columns that correspond to the selected database dataset by level of interestingness using entropy;
wherein the display module further displays the sorted database table columns of the selected database dataset as individually selectable database table columns comprising sorted visualization elements for each of the columns, the visualization elements displaying each corresponding attribute;
the sorting module further receiving a selection of one or more of the corresponding attributes and based on the selection of the one or more of the corresponding attributes, repeating the sorting the database table columns by level of interestingness using entropy.

18. The system of claim 17, wherein the using entropy comprises calculating the entropy of each of the corresponding attributes and normalizing the entropy to a 0-1 range.

19. The system of claim 17, wherein the sorting module further receives a selection of a refinement from the display of sorted database table columns and, in response:
applies the selected refinement to the data; and
re-sorts the database table columns of the refined data.

20. The system of claim 17, wherein the displaying one or more selectable database datasets is automatically generated without any user input of search terms.

* * * * *